(12) United States Patent
Vermeiren et al.

(10) Patent No.: US 7,922,996 B2
(45) Date of Patent: *Apr. 12, 2011

(54) ZEOLITE COMPOSITIONS AND PREPARATION AND USE THEREOF

(75) Inventors: Walter Vermeiren, Houthalen (BE); Jean-Pierre Dath, Beloeil (BE); Valérie Buono, Nimy (BE)

(73) Assignee: Total Raffinage Marketing, Puteaux (FR)

( * ) Notice: Subject to any disclaimer, the term of this patent is extended or adjusted under 35 U.S.C. 154(b) by 716 days.

This patent is subject to a terminal disclaimer.

(21) Appl. No.: 11/791,752

(22) PCT Filed: Nov. 25, 2005

(86) PCT No.: PCT/IB2005/003555
§ 371 (c)(1),
(2), (4) Date: Aug. 10, 2007

(87) PCT Pub. No.: WO2006/056876
PCT Pub. Date: Jun. 1, 2006

(65) Prior Publication Data
US 2008/0050308 A1 Feb. 28, 2008

(30) Foreign Application Priority Data
Nov. 26, 2004 (EP) .................... 04292794

(51) Int. Cl.
*C01B 39/00* (2006.01)
*C01B 37/00* (2006.01)
*C01B 33/20* (2006.01)

(52) U.S. Cl. ........ 423/713; 423/122; 423/123; 423/140; 423/141; 423/277; 423/326; 423/328.2; 502/60; 502/202; 502/240; 502/242; 502/258; 502/263

(58) Field of Classification Search ............ 423/713, 423/85, 122, 123, 140, 141, 277, 328.2, 326; 502/60, 202, 240, 242, 258, 263
See application file for complete search history.

(56) References Cited

U.S. PATENT DOCUMENTS

| | | | |
|---|---|---|---|
| 4,088,605 A | | 5/1978 | Rollmann |
| 4,203,869 A | | 5/1980 | Rollmann |
| 4,503,164 A | | 3/1985 | Sato |
| 4,533,533 A | | 8/1985 | Dewing et al. |
| 4,623,527 A | * | 11/1986 | Derouane et al. ............. 423/713 |
| 4,654,316 A | | 3/1987 | Barri et al. |
| 4,673,559 A | * | 6/1987 | Derouane et al. ............. 423/701 |
| 4,713,227 A | * | 12/1987 | Derouane et al. ............. 423/701 |
| 4,788,374 A | | 11/1988 | Chu et al. |
| 4,891,197 A | * | 1/1990 | Derouane et al. ............. 423/279 |
| 5,013,537 A | * | 5/1991 | Patarin et al. ................. 423/705 |
| 5,320,822 A | * | 6/1994 | Ozin et al. .................... 423/700 |
| 6,114,551 A | | 9/2000 | Levin et al. |

FOREIGN PATENT DOCUMENTS

| | | |
|---|---|---|
| EP | 0 113 473 A1 | 7/1984 |
| EP | 0 174 780 A2 | 3/1986 |
| EP | 0251589 * | 1/1988 |

OTHER PUBLICATIONS

Peng Wu, et al., "Hydrothermal Synthesis of a Novel Titanosilicate with MWW Topology", Chemistry Letters, Jul. 5, 2000, pp. 774-775, No. 7, Chemical Society of Japan.

Peng Wu, et al., "A Novel Titanosilicate with MWW Structure. I. Hydrothermal Synthesis, Elimination of Extraframework Titanium, and Characterizations", Journal of Physical Chemistry B., Apr. 15, 2001, pp. 2897-2905, vol. 105, No. 15.

* cited by examiner

*Primary Examiner* — David M Brunsman
(74) *Attorney, Agent, or Firm* — Sughrue Mion, PLLC (57) ABSTRACT

This invention relates to novel compositions of zeolites or microporous metallosilicates characterized by a continuous spatial distribution of the metal and silicon in the crystals and characterized by a crystal surface enriched in silicon relative to the internal part of the same crystals. This invention also relates to a synthesis method of producing these metallosilicates with spatial distribution of the constituting elements. These novel zeolitic compositions can be used in various hydrocarbon conversion reactions. The crystalline metallosilicates can be selected from the group consisting of aluminosilicates, gallosilicates, ferrosilicates, titanosilicates and borosilicates.

42 Claims, 6 Drawing Sheets

Figure 2: Examples 1 and 2

Figure 3: Examples 3, 4 and 5

Figure 5: Comparative Example 3 and example 7

ZEOLITE COMPOSITIONS AND PREPARATION AND USE THEREOF

This application is a 371 of PCT/IB05/03555, file Nov. 25, 2005.

The present invention relates to crystalline metallosilicate, or zeolite, compositions and their preparation and use.

Zeolites have been demonstrated to posses catalytic properties for various types of hydrocarbon conversions. In addition, the zeolites have been used as adsorbents and catalyst carriers for various types of hydrocarbon conversion processes, and other applications. These zeolites are ordered, porous, crystalline material having a definite crystalline structure as determined by x-ray diffraction, possessing a large number of smaller cavities that may be interconnected by pores. The dimensions of these channels or pores are such as to allow adsorption of molecules with certain dimensions while rejecting those with larger dimensions. The interstitial spaces or channels formed by the crystalline network enable zeolites to be used as molecular sieves in separation processes and catalysts and catalyst supports in a wide variety of hydrocarbon conversion processes. Zeolites or metallosilicates are comprised of a lattice of silicon oxide and optionally a metal oxide combined optionally with exchangeable cations such as alkali or alkaline earth metal ions. Although the term "zeolites" includes materials containing silica and optionally alumina, it is recognized that the silica and alumina portions may be replaced in whole or in part with other oxides. For example, germanium oxide can replace the silica portion. The metal cations other than silicon in the oxide framework of metallosilicates may be iron, aluminium, titanium, gallium and boron. Accordingly, the term "Zeolites" means here microporous crystalline metallosilicates materials. The catalytic properties of metallosilicates are the result of the presence of elements different than silicon in the framework of the zeolite. Substitution of metal cations for silicon in the oxide framework gives rise to potential catalytic active sites. The best known metallosilicates are aluminosilicates that exhibit acidic groups in the pores of the crystals. The substitution of silica with elements such as alumina with a lower valence state creates a positive charge deficiency, which can be compensated by a cation such as a hydrogen ion. The acidity of the zeolite can be on the surface of the zeolite and also within the channels of the zeolite. Within a pore of the zeolite, hydrocarbon conversion reactions such as paraffin isomerization, olefin skeletal or double bond isomerization, oligomerisation, disproportionation, alkylation, and transalkylation of aromatics may be governed by constraints imposed by the channel size of the molecular sieve.

The acidic protons, present in the interior of the pores, are subject to shape selective constraints. The principles of "shape selective" catalysis have been extensively reviewed, e.g. by N. Y. Chen, W. E. Garwood and F. G. Dwyer in "Shape selective catalysis in industrial applications", 36, Marcel Dekker, Inc., 1989. However, acidic groups can also be present at the external surface of the metallosilicate crystals. These acidic groups are not subject to the shape selective constraints imposed by the crystalline pore-structure. The acidic groups on the external surface are called here external surface acidity. The external surface acidity may catalyse undesirable reactions that decrease the product selectivity. Typical unselective surface catalysed reactions that are not subject to the constraints imposed by the crystalline pore-structure are: (1) extensive oligo/polymerisation of olefins, (2) isomerisation of alkylaromatics, selectively produced inside the constrained pore-structure (3) formation of polycyclic aromatics (4) multiple alkylation of aromatics (5) multiple branching of olefins and/or paraffins and (6) formation of macromolecular type precursors of coke leading to undesired carbon laydown. The relative amount of external surface acidity is determined by the crystal size; small crystals possess more external surface acidity than large crystals. It is often advantageous to reduce the presence of the external surface acidity of the zeolites or metallosilicate in order to improve their process performance. Performance measures include product selectivity, product quality and catalyst stability.

Treatment of zeolites to achieve partial dealumination thereby modifying the activity thereof is well known. Conventional techniques for zeolite dealumination include hydrothermal treatment, mineral acid treatment with HCl, HNO3, and H2SO4, and chemical treatment with SiCl4 or ethylenediaminetetraacetic acid (EDTA) or combinations of them. The treatments, however, are not restricted to the zeolite crystal surface. They also modify the internal pores of the zeolites. Such methods are described for instance in U.S. Pat. No. 3,442,795 and in the articles by Kerr, G. T., in J. Phys. Chem. 71, 4155 (1967) and by Scherzer, J. in J. Catalysis, 54, 285-288 (1978). In these processes, the acid form of a zeolite is subjected to hydrolysis, to remove aluminum from the aluminosilicate framework. The aluminum can then be physically separated to a limited extent from the aluminosilicate by the use of complexing or chelating agents such as ethylenediaminetetraacetic acid or carboxylic acid, to form aluminum complexes that are readily removable from the aluminosilicate. One of the major drawbacks of the prior art dealumination techniques is that they remove aluminium atoms from the entire framework of the zeolite i.e. both the external surface and the internal pores within the zeolite. Whilst removal of the aluminium atoms from the external surface is desirable to moderate non-shape-selective activity of the zeolite, the removal of aluminium atoms from within the pore structure is unwanted because it results hence in a reduction in catalytic sites characterised by their shape-selective constraints in the zeolite pores. Removal of internal aluminium atoms from the framework within the pores can also cause partial destruction of the zeolite pore structure and partial pore blocking due to the presence of amorphous aluminium oxide species.

To minimise the occurrence of undesirable unselective reactions catalysed on the external surface of the zeolite crystals, methods have been used to reduce or eliminate surface acidity by extraction with bulky reagents or by surface poisoning. In the prior art, various techniques have been employed for preparing external surface deactivated zeolites and hence the relative ratio of internal to external catalysed reactions.

Using larger crystal sizes can increase this ratio. U.S. Pat. No. 4,100,215 describes the use of zeolite crystals greater than 1 micron to increase the para-xylene in the methylation of toluene. However, when diffusion limitation is important, large crystals can reduce the overall catalytic activity.

U.S. Pat. No. 4,001,346 describes a method for preparing a zeolite that has undergone prior treatment to deposit a coating of coke on the surface of the zeolite.

Zeolite modification by treatment with large cations such as cationic nitrogen or phophorus compounds and large branched compounds such as polyamines and the like is described in U.S. Pat. No. 4,101,595. Bulky phenolic and silicating zeolite surface modifying agents are described in U.S. Pat. No. 4,100,215 and U.S. Pat. No. 4,002,697, respectively. The surface acidity of the zeolite can be eliminated or reduced by treatment with bulky dialkylamine reagents as described in U.S. Pat. Nos. 4,520,221 and 4,568,786. U.S. Pat. No. 4,716,135 discloses zeolite catalysts that can be surface inactivated by cofeeding a sterically hindered base organophosphorus compound.

Selective dealumination techniques have been described in the past. U.S. Pat. No. 5,080,878 discloses modifying a crystalline aluminosilicate zeolite with a fluorosilicate salt to extract surface zeolite aluminum, which is replaced by silicon. In accordance with U.S. Pat. No. 5,043,307, the surface acidity of a crystalline aluminosilicate zeolite catalyst is reduced to provide a modified zeolite having enhanced catalytic selectivity for a variety of hydrocarbon conversions and, in particular, for the oligomerization of olefin to provide lubes of high viscosity index. The described process for modifying a crystalline aluminosilicate comprises steaming as synthesized zeolite containing organic template material and then contacting the zeolite in the ammonium, alkali metal, or hydrogen form with a dealuminizing agent which forms a water soluble complex with aluminum. The foregoing treatment results in the reduction of acid sites on the zeolite essentially without affecting its internal structure. As a result, the incidence of undesirable side reactions tending to occur on the surface of the untreated catalyst and which result in lower product yield and/or inferior product characteristics is significantly lessened. Similar processes to prepare surface inactivated zeolite have been described in U.S. Pat. Nos. 5,234,872, 5,284,989, 5,308,471 and 5,242,676 in which the presence of organics within the zeolite pores facilitates surface dealumination because it precludes the dicarboxylic acid from entering the pores and hence only dealuminating the surface of the zeolite crystals is possible. In another disclosure, U.S. Pat. No. 5,304,695 the use of dealuminating agents, which possesses an average cross section diameter greater than that of the zeolite pores is employed to selectively dealuminate the zeolite surface. There is disclosed in U.S. Pat. No. 5,723,710 a new form of zeolite Beta that shows substantially greater stability and greater catalyst lifetime when used in the alkylation and transalkylation of aromatic compounds. This surfacemodified zeolite beta is prepared by treating a templated zeolite Beta with an acid at a pH between about 0 and about 2 and a temperature up to about 125° C. for a time sufficient to modify the chemical environment of the surface aluminum atom without bringing about dealumination of the zeolite beta.

U.S. Pat. No. 4,677,239 and U.S. Pat. No. 4,533,533 describe a process for selective and controlled dealumination of an aluminosilicate zeolite which is achieved by filling the pore system of the zeolite with a foreign material, for example coke, removing part of the foreign material from the outer portion of the zeolite, dealuminating the outer portion, and then removing the remainder of the foreign material and the use of such a partially dealuminated zeolite as catalyst in a toluene disproportionation reaction leads to greater selectivity to paraxylene. These zeolites are characterised as comprising an inner core having silica to alumina ratio substantially charateristic of the untreated zeolite and an outer skin which has higher silica to alumina ratio than said inner core. Other selective surface dealumination processes have been given in U.S. Pat. Nos. 4,654,454 and 4,654,316. The zeolite is ion-exchanged with a first set of cations and than ion-exchanged with a second set of cations which can not enter into the pores of the zeolite and which can be decomposed by thermal treatment. A subsequent dealumination by know techniques results in selective surface dealuminated zeolites.

U.S. Pat. Nos. 4,088,605, 4,148,713 and 4,203,869 disclose a crystalline aluminosilicate zeolite particle containing an aluminum-free outer shell prepared by carrying out the crystallization in a crystallization medium for a given period of time and then altering the crystallization medium to eliminate the aluminum therein. This can be accomplished by a total replacement of the reaction mixture or by complexation of any remaining aluminum ion from the original reaction mixture with reagents such as gluconic acid, tartaric acid, nitrilotriacetic acid or EDTA. These methods, however, often increase the complexity of the process. It is a two-step process. In order to be able to control such processes operating conditions have to be such that the crystallisation reactions are slow enough so as to interrupt at the right moment the crystallisation process and alter the reaction medium. Moreover, the organic complexing compounds do not resist the high reaction temperature needed to produce zeolites in an economic viable period of time. Zeolite type catalyst having a double structure that comprises a core made of crystalline borosilicate and a shell made of crystalline silicon oxide has been described in U.S. Pat. No. 4,503,164. In U.S. Pat. No. 4,788,374 a surfaceinactive shape selective metallosilicate catalyst, useful for the conversion of lower molecular weight olefins to liquid hydrocarbons such as gasoline, distillate, and high viscosity lube oils, is prepared by a process comprising forming a silica shell on a metallosilicate core by crystallizing silica in the presence of fluoride ion onto the surface of the core. The catalyst prepared according to the process of the mentioned invention comprises an inner portion and an outer portion disposed as a porous shell around the inner portion wherein the inner portion comprises a medium pore metallosilicate and the outer portion comprises crystalline silica substantially free of acid sites, the outer portion being crystallised from an alkaline silicate solution containing fluoride ion. In U.S. Pat. No. 6,013,851 a catalyst having a core and surface layer, providing a lower branching in olefin oligomerisation has been described. Each particle of the molecular sieve comprising a core having deposited thereon a surface layer, the core comprising a zeolite containing silicon and aluminium, and the surface layer comprising a zeolite containing silicon and aluminium, the zeolite of the surface layer being of the same crystalline structure as the core and having a higher silicon: aluminium ratio than that of the core. U.S. Pat. No. 5,994,603 discloses the use of a zeolite bound zeolite for methylation of toluene to para-xylene. Prior to using in commercial processes, the zeolite crystals are usually bound. When such a bound zeolite is used in catalytic conversion processes such as toluene methylation, the binder may affect the chemical reactions that are taking place within the zeolite and also may it catalyse undesirable reactions that can result in the formation of undesirable products. The use of second zeolite crystals as a binder results in a catalyst which provides a means for controlling undesirable reactions taking place on or near the surface of the first zeolite crystals since the acidity of the second zeolite can be carefully controlled and can have improved mass transfer of reactants and greater access to and from the pores of the zeolite. The zeolite bound zeolite catalyst used in the process of the described invention is preferably prepared by a three-step procedure. The first step involves the synthesis of the first zeolite crystals. Next, a silica-bound aluminosilicate zeolite is prepared preferably by mixing a mixture comprising the aluminosilicate zeolite crystals, a silica gel or sol, water and optionally an extrusion aid and, optionally, the metal component until a homogeneous composition in the form of an extrudable paste develops. The final step in the three step catalyst preparation process is the conversion of the silica present in the silica-bound catalyst to a second zeolite which serves to bind the first zeolite crystals together. The first zeolite crystals are thus held together without the use of a significant amount of non-zeolite binder. To prepare the zeolite bound zeolite catalyst, the silica-bound aggregate can be first aged in an appropriate aqueous solution at an elevated temperature. Next, the contents of the solution and the temperature at which the aggregate is aged should be selected to convert the amorphous silica binder into the second zeolite. It is preferable that the second zeolite be of the same type as the first zeolite.

Several processes have been described for coating of the external surface of zeolite crystals with a silica layer by means of vapour phase or liquid phase deposition techniques of organosilicon compounds (U.S. Pat. Nos. 4,465,886, 4,477,583, 4,950,835, 5,349,113, 5,349,114, 5,365,004, 5,365,003, 5,403,800 and 5,659,098). These preparation methods use expensive silicon compounds and require often several steps, making the process difficult to reproduce. Deposition of silicon coating is not always limited to the external surface and the internal surface may also be inactivated resulting in a significant reduced catalytic activity.

The above described processes for preparing zeolites with reduced surface activity and hence increased product selectivity are all multi-step processes requiring post-treatment steps after the initial synthesis of the zeolite having still significant surface activity. There is thus a need for an improved method to prepare more efficiently zeolites with reduced surface activity. In has never been recognised how to prepare in a controlled manner in a one-step process zeolites or metallosilicates characterised directly by a spatial distribution of the constituting elements and hence a strongly reduced surface activity without requiring post-treatment steps.

Classical zeolite or metallosilicates syntheses are carried out in aqueous media under hydrothermal and autogeneous conditions. The aqueous solution contains the nutrients as the metal precursor compound, the silicon precursor, mineralisers and often also organic compound that act as template or as pore fillers during the crystallisation process. A typical preparation involves heating a mixture, containing a source of silica and optionally a source of a second metal, like aluminium, iron, gallium, boron and titanium, in water in the presence of a mineralizer and a template or a structure-directing agent until crystallisation occurs. The general principles of zeolite synthesis are well documented, e.g. "Synthesis of High-silica Aluminosilicate Zeolites", Study of Surface Science and Catalysis, vol. 33, Elsevier, 1987 and "Synthesis of Aluminosilicate Zeolites and Related Silica-based Materials", Catalysis and Zeolites: Fundamentals and Applications, Springer, 1999. The mineralizers who are usually alkali or alkaline earth hydroxides, provide the function of a solubilizer of the silicon and second metal sources transporting them through the reaction solution or gel to nucleation sites or growing crystals. The template can be a cationic or a neutral organic compound and tends to favour the formation of a particular zeolite structure. The templates and mineralisers may further control the pH of the medium and may provide charge balance with the anionic framework of the metallosilicate. Various organic molecules have been described in the prior art, which have different kinds of functions beside porefiller effects. These additional organic molecules may favour the formation of a particular zeolite structure above another one.

U.S. Pat. No. 5,063,038 and U.S. Pat. No. 5,160,500 provide methods for preparing a zeolite other than ZSM-5 from a reaction mixture comprising a mixed organic directing agent which is a combination of (a) an organic nitrogen containing compound such as an amine or a quaternary ammonium compound and (b) an alcohol and/or diol. Particular zeolites synthesized by this method include ZSM-22 and ZSM-23. The use of an alcohol or a diol inhibits the coformation of ZSM-5. Especially when used to prepare ZSM-23, this method enables the preparation of more catalytically active ZSM-23 of reduced crystallite size and also enables the use of lower crystallisation temperatures. U.S. Pat. No. 4,199, 556 discloses the use of alcohols with 2 to 5 carbons together with seeds of the ZSM-5 crystals and ammonium hydroxide to obtain products substantially deficient of organic ammonium cations. U.S. Pat. No. 3,702,886 describes the synthesis of ZSM-5 in the presence of glycerol leading to elongated crystals. EP-A-87017 discloses a process for the production of new zeolite structure by reacting an aqueous mixture containing a silica source, an alumina source, an alkali or alkaline earth source and methanol. In EP-A-102497 the use of ethylene glycol is described for the preparation of crystalline silicates. Ethylene glycol does not remain in the crystalline silicates, but plays the role in the formation of the desired crystalline structure. In the above given disclosures the additional organic compounds are water-soluble and play the role of structure-directing agent. Jacobs et al. reviewed the synthesis of ZSM-5 in the presence of alcohols in "Synthesis of High-Silica Aluminosilicate Zeolites", Study of Surface Science and Catalysis, vol. 33, Elsevier, 1987. Various water-soluble alcohols have different effects on crystallisation efficiency and crystal size.

Bibby et al. in Nature, 317, p. 157, 1985 discloses the preparation of sodalite in a non-aqueous solvent system, exemplified by ethylene glycol or propanol. Erp et al. in Zeolites, 7, p. 286,1987 and Qisheng et al. in J. Chem. Soc., Chem. Commun., p. 1486, 1988 describe the synthesis of zeolites with 4, 5 or 6 membered rings in organic solvents, including glycols, glycerol, sulfolane, dimethylsulfoxide, ethanol, pyridine and C6-C7 alcohols. In U.S. Pat. No. 5,320, 822 a process is described for the synthesis of large crystals of the order of 0.3-3 mm in size. The zeolites are prepared in a growth medium containing the silica, alumina and charge balancing ion sources, a nitrogen-containing organic base, hydrogen fluoride and optionally an organic solvent and water in an amount such that the ratio water to framework atoms is no greater than about 6 molar and such that the ratio of water to nitrogen-containing base is no greater than 0.3 molar. The examples given above show that certain zeolites can be synthesised in essential water-free organic solvent media, given rise to particular zeolite structures or zeolite crystal textures.

The prior art provides processes in which a primary prepared zeolite is post-treated to coat the primary prepared zeolite in a second step with a shell of secondary prepared zeolite or to coat the primary prepared zeolite in a second step with a layer of silica with the aim to provide zeolite particles in which the composition of the core is different from the composition of the shell of the particles.

Therefore, it is an aim of the present invention to provide novel zeolite or metallosilicate compositions prepared by direct one-step synthesis characterised by a continuous spatial distribution of the constituting elements and characterised by a crystal outer surface enriched in silicon relative to the inner part of the same crystals. As a result, the metallosilicates with novel compositions characterised by a spatial distribution of the constituting elements have reduced surface activity relative to the internal pores, which are subject to shape-selective constraints of the pore-structure. Such a continuous spatial distribution permits to avoid problems of lack of selectivity observed for some reactions performed with compositions without continuous spatial distribution. It is a further aim of the present invention to provide a process for preparing in a controlled manner in a one-step process metallosilicates characterised with a continuous spatial distribution of the constituting elements, not requiring any additional post-treatment step.

The present invention provides a process for producing a crystalline metallosilicate composition, the method comprising the steps of:

(a) providing a two-phase liquid medium comprising an aqueous liquid phase and a non-aqueous liquid phase, the two-phase liquid medium further comprising at least one silicon-containing compound and at least one metal-containing compound; and (b) crystallising the crystalline metallosilicate composition from the two-phase liquid medium.

The at least one silicon-containing compound may be present in both the aqueous liquid phase and a non-aqueous liquid phase and the at least one metal-containing compound may be present in substantially the aqueous liquid phase.

Preferably, the at least one silicon-containing compound is selected from at least one of an alkali metal silicate, a tetraalkyl orthosilicate, precipitated silica, pyrogenic silica, and an aqueous colloidal suspension of silica.

Preferably, the at least one metal-containing compound is selected from at least one of the metal oxide, a metal salt, and a metal alkoxide.

Preferably, the metallosilicate is an aluminosilicate, and the at least one metal-containing compound comprises an aluminium compound for which the source of aluminum is selected from at least one of hydrated alumina dissolved in an alkaline solution, aluminum metal, a water-soluble aluminum salt, such as aluminum sulphate or aluminium chloride, sodium aluminate and an alkoxide, such as aluminum isopropoxide Preferably, the metallosilicate is a borosilicate, and the at least one metal-containing compound comprises a boron compound for which the source of boron is selected from at least one of hydrated boron oxide dissolved in an alkaline solution, a water-soluble boron salt, such as boron chloride, and an alkoxide.

Preferably, the metallosilicate is a ferrosilicate, and the at least one metal-containing compound comprises an iron compound for which the source of iron is a water soluble iron salt.

Preferably, the metallosilicate is a gallosilicate, and the at least one metal-containing compound comprises a gallium compound for which the source of gallium is a water soluble gallium salt.

Preferably, the metallosilicate is a titanosilicate, and the at least one metal-containing compound comprises a titanium compound for which the source of titanium is selected from at least one of titanium halides, titanium oxyhalides, titanium sulphates and titanium alkoxides.

Preferably, the non-aqueous liquid phase comprises an organic solvent which is substantially water insoluble or water immiscible.

Preferably, the organic solvent comprises at least one of an alcohol having at least 5 carbon atoms or a mercaptan having at least 5 carbon atoms.

Preferably, the alcohol has up to 18 carbon atoms and the mercaptan has up to 18 carbon atoms.

Preferably, the weight ratio of the liquid medium of the non-aqueous liquid phase to the liquid medium of the aqueous liquid phase is from 0.01/1 to 5/1.

Preferably, the molar ratio of the liquid medium of the non-aqueous liquid phase to the silicon in the two-phase liquid medium is from 100/1 to 0.5/1.

Preferably, the process further comprises the step of forming the two-phase liquid medium by providing a first, aqueous, medium and a second, non-aqueous, medium and combining the first and second media together to form the two-phase liquid medium.

Preferably, the first, aqueous, medium comprises a first portion of the at least one silicon-containing compound and the second, non-aqueous, medium comprises a second portion of the at least one silicon-containing compound.

Preferably, the first, aqueous, medium comprises from 25 to less than 100 wt % of the at least one silicon-containing compound and the second, non-aqueous, medium comprises from greater than 0 to 75 wt % of the at least one silicon-containing compound.

Preferably, the first, aqueous, medium comprises a first silicon-containing compound and the second, non-aqueous, medium comprises a second silicon-containing compound.

Preferably, the second silicon-containing compound comprises a silicon alkoxide.

Preferably, the process further comprises adding to the two-phase liquid medium an aqueous solution or dispersion of the at least one metal-containing compound.

The present invention also provides a crystalline metallosilicate composition comprising crystallites having a crystal outer surface layer having a depth of about 10 nm below the outer surface, and an inner part extending inwardly from a depth of about 50 nm below the outer surface, wherein the atomic ratio of silicon to metal in the metallosilicate composition is at least 1.5 times higher in the crystal outer surface layer as compared to that in the inner part.

The crystalline metallosilicate composition comprising crystallites provided by the invention is characterised by a continuous spatial distribution of the silicon to metal, and has an atomic ratio of silicon to metal in the metallosicate composition which decreases continuously from the outer surface to the inner part of the crystal.

Preferably, the inner part has a silicon/metal atomic ratio of from 15 to 1000, more preferably from 20 to 500, and the crystal surface has a silicon/metal atomic ratio of from 22.5 to 15000, more preferably from 45 to 5000.

Preferably, the inner part has a substantially constant silicon/metal atomic ratio.

Preferably, the metallosilicate is an aluminosilicate, a borosilicate, a ferrosilicate, a gallosilicate, or a titanosilicate.

The present invention additionally provides the use of the crystalline metallosilicate composition of the invention as a catalyst component in a hydrocarbon conversion process.

The present invention yet further provides a process for producing a crystalline metallosilicate composition, the method comprising the steps of:

(a) providing an aqueous liquid comprising at least one silicon-containing compound dissolved or dispersed therein;

(b) providing a non-aqueous liquid;

(c) combining the aqueous liquid and the non-aqueous liquid to form a two-phase liquid medium;

(d) either (i) additionally providing the aqueous liquid provided in step (a) with at least one metal-containing compound dissolved or dispersed therein or (ii) adding, either to the aqueous liquid provided in step (a), prior to step (c), or to the two-phase liquid medium formed in step (c), an aqueous solution or dispersion of the at least one metal-containing compound, and (e) crystallising the crystalline metallosilicate composition from the two-phase liquid medium.

Preferably, the at least one silicon-containing compound is selected from at least one of an alkali metal silicate, a tetraalkyl orthosilicate, precipitated silica, pyrogenic silica, and an aqueous colloidal suspension of silica.

Preferably, the at least one metal-containing compound is selected from at least one of the metal oxide, a water-soluble metal salt, and a metal alkoxide.

Preferably, the metallosilicate is an aluminosilicate, a borosilicate, a ferrosilicate, a gallosilicate, or a titanosilicate.

Preferably, the non-aqueous liquid comprises an organic solvent which is substantially water insoluble or water immiscible.

Preferably, the organic solvent comprises at least one of an alcohol having at least 5 carbon atoms or a mercaptan having at least 5 carbon atoms.

Preferably, the alcohol has up to 18 carbon atoms and the mercaptan has up to 18 carbon atoms.

Preferably, the weight ratio of the non-aqueous liquid to water in the two-phase liquid medium is from 0.01/1 to 5/1.

Preferably, the molar ratio of the non-aqueous liquid phase to the silicon in the two-phase liquid medium is from 100/1 to 0.5/1.

Preferably, the aqueous liquid provided in step (a) comprises a first silicon-containing compound and the non-aqueous liquid provided in step (b) comprises a second silicon-containing compound dissolved or dispersed therein.

Preferably, in the two-phase liquid medium the first silicon-containing compound comprises from 25 to less than 100 wt % of the at least one silicon-containing compound and the second silicon-containing compound comprises from greater than 0 to 75 wt % of the at least one silicon-containing compound.

Preferably, the second silicon-containing compound comprises a silicon alkoxide.

Preferably, the aqueous liquid provided in step (a) comprises all of the at least one silicon-containing compound.

Preferably, the aqueous solution or dispersion of the at least one metal-containing compound added in step (d) comprises all of the at least one metal-containing compound.

Preferably, the aqueous solution or dispersion of the at least one metal-containing compound added in step (d) further comprises a structure directing agent for the metallosilicate comprising at least one organic or inorganic compound containing nitrogen, oxygen, sulphur or phosphorous.

To the inventors' knowledge it has never previously been recognised that the use of a two-phase medium of which one is an aqueous medium and the other an essential water-insoluble medium could result in continuous spatial distribution of the constituting elements and could result in a crystal surface of the metallosilicate that is enriched in silicon compared to the inner part of the same crystals. The present invention provides a method for preparing in a one-step process metallosilicate crystals characterised by a continuous spatial distribution of the constituting elements and characterised by a surface composition that is enriched in silicon compared to the inner part of the same crystals by using a two-phase crystallisation medium.

The process of the present invention for preparing metallosilicates with novel compositions characterised by a continuous spatial distribution of the constituting elements and characterised by a surface enriched in silicon preferably comprises the following procedure:
1. preparing an aqueous reaction mixture containing sources of a trivalent metal oxide such as aluminium oxide, iron oxide, boron oxide or gallium oxide, tetravalent oxides such as silica, germania and titania, alkali metal or ammonium cations and optionally a structure-directing agent;
2. adding to the aqueous mixture an organic solvent mixture, containing at least one alcohol or mercaptan, the organic mixture being essentially not soluble or miscible in the aqueous mixture, containing optionally an organic silicon compound, e.g. tetraethyl-orthosilicate,
3. heating the two-phase media mixture optionally under agitation and for sufficient time at a sufficient temperature to achieve crystallisation of the desired metallosilicate; and
4. Stopping the crystallisation process by cooling the crystallisation mixture, filtering and washing the crystals to remove any non-crystallised nutrients.

BRIEF DESCRIPTION OF THE DRAWINGS

Embodiments of the present invention will now be described by way of example only with reference to the accompanying drawings, in which.

Metallosilicates characterised by a spatial distribution of the constituting elements and characterised by a surface enriched in silicon that can be produced by the process of the present invention can be any of the synthetic crystalline zeolites. Examples of these zeolites include large pore zeolites, medium pore size zeolites, and small pore zeolites. These zeolites and their isotypes are described in "Atlas of Zeolite Structure Types", eds. W. H. Meier, D. H. Olson and Ch. Baerlocher, Elsevier, Fourth Edition, 1996, which is hereby incorporated by reference. The structure types are provided by the "IUPAC Commission of Zeolite Nomenclature". A large pore zeolite has a pore size of at least about 0.7 nm and includes the following structure types with examples given between brackets: LTL (L), MAZ (mazzite, Omega, ZSM4), MEI (ZSM-18), FAU (zeolite Y, zeolite X), EMT (CSZ-1, ECR-30, ZSM-3 and ZSM-20), OFF (Offretite), *BEA (Beta), MWW (MCM-22, ITQ-1, PSH-3, SSZ-25, ERB-1) and MOR (Mordenite). A medium pore size zeolite generally has a pore size from about 0.5 nm to about 0.7 nm and includes, for example, CON (CIT-1, SSZ-26, SSZ-33), IFR (ITQ-4, MCM-58 and SSZ-42), MFI (ZSM-5, silicalite, TS-1), MEL (ZSM-11, silicalite-2, TS-2), MTW (ZSM-12, CSH-5, Nu-13, Theta-3), EUO (ZSM-50, TPZ-3), MTT (ZSM-23, EU-13, ISI-4, KZ-1), MFS (ZSM-57), HEU (Clinoptilolite), FER (ZSM35, Ferrierite, FU-9, ISI-6, NU-23, Sr-D), NES (NU-87), SFF (SSZ-44), STF (SSZ-35) and TON (ZSM-22, Theta-1, ISI-1, KZ-2 and NU-10) structure types. A small pore size zeolite has a pore size from about 0.3 nm to about 0.5 nm and includes, for example, CHA (Chabasite), ERI (Erionite).

In general, the chemical formula of anhydrous crystalline metallosilicate expressed in terms of moles may be represented by the formula:

$$(4-n)/mM.(TO_2).SiO_2)x$$

Wherein "M" is selected from the group consisting of hydrogen, ammonium, monovalent, divalent and trivalent cations and mixtures thereof; "m" is the valence of the charge-balancing cation "M" and "x" is a number of at least 2, preferably at least 10, said value being dependent upon the particular type of zeolite, and "T" is a metal in the anionic oxide framework structure of the metallosilicate such as aluminium, gallium, boron, iron, or titanium. "n" the valence of the "T". "2x" is also the molar ratio of silica to "T" metaloxide. "x" is the atom/atom ratio of silicon to "T" metal in the framework of the metallosilicate.

The sources of the various elements of the metallosilicate may be any of those found in the commerce or prepared on purpose. For example, the source of silicon may be a silicate, e.g., an alkali metal silicate, a tetraalkyl orthosilicate, precipitated or pyrogenic silica, or preferably an aqueous colloidal suspension of silica. When the metallosilicate is an aluminosilicate zeolite, the source of aluminum is preferably hydrated alumina dissolved in an alkaline solution or aluminum metal, a water-soluble aluminum salt, e.g., aluminum sulphate or aluminium chloride, sodium-aluminate or an alkoxide, e.g., aluminum isopropoxide. When the metallosilicate is a borosilicate zeolite, the source of boron is preferably hydrated boron oxide dissolved in an alkaline solution or a water-soluble boron salt, e.g., boron chloride or an alkoxide. When the metallosilicate is a ferrosilicate or gallosilicate, the source of iron or gallium can almost be any iron or gallium salts that is readily soluble in water. When the metallosilicate is titanosilicate, the source of titanium can be titanium halides, titanium oxyhalides, titanium sulphates or titanium alkoxides. The atom/atom ratio of silicon to metal "T" depends on the metal "T" and on the application of the metallosilicate and is at least 2/1 to about 10000/1, preferably from 5/1 to about 5000/1 and most preferred from about 10/1 to 1000/1. In the aqueous crystallisation medium the amount of potential metallosilicate, based on the anhydrous formula given above can be from about 1 to about 50 weight percent, preferably from 4 to 25 and most preferred from 6 to 15 weight percent. Optionally one or more directing agents, such as organic or inorganic compounds containing nitrogen, oxygen, sulfur, or phosphorous may be introduced into the synthesis mixture. When the directing agent is a cation, it may also be introduced in the form of a mixture of hydroxide and salt, e.g., a halide. The agent used will depend on the metallosilicate prepared by the process. The amount of the directing agent depends on the metallosilicate prepared by the process. The source of "M" cations may be alkali or alkaline earth hydroxides or salts. "M" may also be ammonium hydroxide or salts. Together with the directing agent(s) the "M" cation will determine the pH of the crystallising medium. The pH is generally between 8 and 13. Its starting value will be depended on the metallosilicate prepared by the process and by the desired size of the crystals and desired rate at which the crystallisation has to proceed.

The organic solvent medium preferably is essentially water-insoluble or water-immiscible. The organic solvent medium preferably contains at least one alcohol or mercaptan, which is essentially water-insoluble. Examples of alcohols or mercaptans which are essentially water-insoluble are alcohols or mercaptans with at least 5 up to about 18 carbons. The organic solvent medium can optionally contain other water-insoluble organic compounds that do not bear an alcohol or mercaptan functional group. A person skilled in the art knows how to alter the hydrophobicity of the organic medium when required for the synthesis of a particular metallosilicate. Organic compounds that may be employed together with the required amount of water-insoluble alcohols or mercaptans can be halohydrocarbons, paraffinic, cycloparaffinic, aromatic hydrocarbons or mixture thereof. The weight ratio of the organic medium to the aqueous medium is from about 0.01/1 to about 5/1, most preferred from 0.1/1 to about 2/1. The molar ratio of alcohol or mercaptan to silicon in the crystallisation mixture is from about 100/1 to about 0.5/1, most preferred from about 20/1 to about 1/1. During the preparation of synthesis mixture the source of silicon can be added in a whole or optionally partially to the aqueous medium when it is soluble in it. The source of silicon can also be partially added directly to the organic medium, e.g. alkoxides of silicon are soluble in various types of organic solvents that are essentially water-insoluble. During the preparation of the crystallisation mixture the source of silicon is added to the organic medium from 0 to about 75% of the total amount of used silicon, preferably from 0 to 50%.

The term "near" the surface of the metallosilicate crystals means here the outer region of the crystals with a depth of up to about 10 nm. The atom/atom ratio of silicon to metal "M" near the surface of the crystals prepared according to the present invention is at least 1.5 times higher than the overall bulk silicon to metal "M" ratio, preferably from 1.5 to 15, more preferably from 2 to 10, most preferably from 3 to 5 times higher than the bulk composition, which extends inwardly from a depth of 50 nm or greater.

The order of mixing of the ingredients is not essential and will depend largely on the zeolite being prepared. For instance, two or more separate mixtures, either aqueous or organic can be prepared each containing one or more of the constituting elements. First the aqueous mixtures can be mixed in a controlled manner under vigorous stirring. Generally a homogeneous gel or sol is produced upon the mixing of the aqueous mixtures. This crystallisation medium precursor may be aged at a temperature at which no crystallisation occurs, optionally nucleation may be started. The organic mixture may then be added to the aqueous mixture, gel or sol. Optionally one of the prepared aqueous solutions may be added to the organic medium after which the other aqueous solution is added in a controlled manner. Optionally the crystallisation two-phase medium may be aged at a temperature at which no crystallisation occurs, optionally nucleation may be started. Persons skilled in the art know equipment used to prepare the zeolite crystals of the present invention. Generally, metallosilicates can be prepared by using autoclaves, which have sufficient agitation to homogenise the crystallisation mixture during heat up until the effective nucleation and crystallisation temperature of the mixture is achieved. The crystallisation vessel can be made of a metal or metal alloys resisting the conditions of the crystallisation or optionally can be coated with a fluorocarbon such as Teflon®™. Other means of introducing agitation known to one skilled in the art can be employed, such as pumping the synthesis mixture from one part of the autoclave to another. Once the crystallisation temperature is reached, the agitation can be continued or can be stopped. The agitation can be such that only one of the two media is homogenised. Optionally only the aqueous medium is homogenised, no additional agitation equipment is present in the organic medium. Generally the agitation of the aqueous medium is fairly gentle; preferably the rotation speed of a blade-type agitator is not higher than about 250 rpm.

Upon completion of crystallization of the metallosilicate, the product crystals are separated from the reaction mixture by, for example, cooling and filtering, and water washed and dried at a temperature of typically from about 25° C. to about 250° C., and more preferably from 80° C. to about 120° C. The crystals prepared by the instant invention can be formed into a wide variety of forms. In cases where a catalyst is produced from the metallosilicate produced by the present invention, the catalyst needs to possess a shape to be applicable in industrial reactors. The crystals can be shaped before drying or partially dried and then shaped or the crystals can be calcined to remove organic template and then shaped. In the case of many catalysts, it is desirable that crystalline zeolites prepared by the process of the present invention are incorporated with binder material resistant to the temperature and other conditions employed in organic conversion processes. It will be easily understood by the person skilled in the art that binder material does not contain the metal element "T" that is incorporated into the framework of the metallosilicate characterised by a spatial distribution of the constituting elements and characterised by a surface enriched in silicon. In addition, the binder material does not contain elements that destroy the spatial distribution of the constituting elements of the metallosilicate or the surface enriched in silicon of the metallosilicate. Examples of binder material may be composited with a porous matrix material, such as silica, zirconia, magnesia, titania, silica-magnesia, silica-zirconia, silica-thoria, and silica-titania, as well as ternary compositions, such as silica-magnesia-zirconia. The relative proportions of metallosilicate component and binder material will vary widely with the metallosilicate content ranging from between about 1 to about 99 percent by weight, more preferably in the range of about 10 to about 85 percent by weight of metallosilicate component, and still more preferred from about 20 to about 80 percent. The metallosilicate prepared by the process of the present invention may be further ion exchanged after calcination to remove organic template as is known in the art either to replace at least in part the original charge-balancing cations present in the metallosilicate with a different cation, e.g. a Group IB to VIII of the Periodic Table metal such as tungsten, molybdenum, nickel, copper, zinc, palladium, platinum, calcium or rare earth metal, or to provide a more acidic form of the zeolite by exchange of original charge-balancing cation with ammonium cations, followed by calcination of the ammonium form to provide the acidic hydrogen form. The acidic form may be readily prepared by ion exchange using a suitable reagent such as ammonium nitrate, ammonium carbonate or protonic acids, like HCl, HNO3 and H3PO4. The metallosilicate may then be calcined at a temperature of 400 to 550° C. to remove ammonia and create the hydrogen form. Particularly preferred cations will depend on the use of the metallosilicate and include hydrogen, rare earth metals, and metals of Groups IIA, IIIA, IVA, IB, IIB, IIIB, IVB, and VIII of the Periodic Table of the Elements. The metallosilicate prepared by the process of the present invention may be further supported by at least one different precursor of metals that have catalytic activity after known pretreatments, e.g. a Group IIA, IIIA to VIIIA, IB, IIB, IIIB to VIB of the Periodic Table metal such as tungsten, molybdenum, nickel, copper, zinc, palladium, platinum, gallium, tin, and/or tellurium metal precursors.

Since the metallosilicate of the present invention characterised by a spatial distribution of the constituted elements and characterised by a surface enriched in silicon have controlled catalytic activity which is the results of the presence of catalytic active sites mainly in the inner part of the metallosilicate crystals and largely the absence of unselective catalytic active sites near the external surface of the metallosilicate crystals, which can cause undesirable side reactions to occur, the metallosilicate of the present invention by itself or in combination with one or more catalytically active substances can have high activity, high selectivity, high stability, or combinations thereof when used as catalysts for a variety of hydrocarbon conversion processes. Examples of such processes include, as non-limiting examples, the following:

1. The alkylation of aromatic hydrocarbons with light olefins to provide short chain alkyl aromatic compounds, e.g., the alkylation of benzene with propylene to provide cumene and alkylation of benzene with ethylene to provide ethylbenzene. Typical reaction conditions include a temperature of from about 100° C. to about 450° C., a pressure of from about 5 to about 80 bars, and an aromatic hydrocarbon weight hourly space velocity of from 1 $hr^{-1}$ to about 100 $hr^{-1}$.

2. The alkylation of polycyclic aromatic hydrocarbons with light olefins to provide short chain alkyl polycyclic aromatic compounds, e.g., the alkylation of naphthalene with propylene to provide mono- or di-isopropyl-naphthalene. Typical reaction conditions include a temperature of from about 100° C. to about 400° C., a pressure of from about 2 to about 80 bars, and an aromatic hydrocarbon weight hourly space velocity of from 1 $hr^{-1}$ to about 100 $hr^{-1}$ 3. The alkylation of aromatic hydrocarbons, e.g., benzene and alkylbenzenes, in the presence of an alkylating agent, e.g., alkyl halides and alcohols having 1 to about 20 carbon atoms. Typical reaction conditions include a temperature of from about 100° C. to about 550° C., a pressure of from about atmospheric to about 50 bars, a weight hourly space velocity of from about 1 $hr^{-1}$ to about 1000 $hr^{-1}$ and an aromatic hydrocarbon/alkylating agent mole ratio of from about 1/1 to about 20/1.

4. The alkylation of aromatic hydrocarbons, e.g., benzene, with long chain olefins, e.g., C14 olefin. Typical reaction conditions include a temperature of from about 50° C. to about 300° C., a pressure of from about atmospheric to about 200 bars, a weight hourly space velocity of from about 2 $hr^{-1}$ to about 1000 $hr^{-1}$ and an aromatic hydrocarbon/olefin mole ratio of from about 1/1 to about 20/1.

5. The alkylation of phenols with olefins or equivalent alcohols to provide long chain alkyl phenols. Typical reaction conditions include temperatures from about 100° C. to about 250° C., pressures from about 1 to 50 bars and total weight hourly space velocity of from about 2 $hr^{-1}$ to about 10 $hr^{-1}$.

6. The transalkylation of aromatic hydrocarbons in the presence of polyalkylaromatic hydrocarbons. Typical reaction conditions include a temperature of from about 150° C. to about 550° C., a pressure of from about atmospheric to about 100 bars, a weight hourly space velocity of from about 1 $hr^{-1}$ to about 500 $hr^{-1}$ and an aromatic hydrocarbon/polyalkylaromatic hydrocarbon mole ratio of from about 1/1 to about 20/1.

7. The isomerization of aromatic (e.g., xylene) feedstock components. Typical reaction conditions for such include a temperature of from about 200° C. to about 550° C., a pressure of from about 1 bars to about 50 bars, a weight hourly space velocity of from about 0.1 $hr^{-1}$ to about 200 $hr^{-1}$ and a hydrogen/hydrocarbon mole ratio of from about 0 to about 100.

8. The disproportionation of toluene to make benzene and paraxylene. Typical reaction conditions including a temperature of from about 200° C. to about 600° C., a pressure of from about atmospheric to about 60 bar, and a weight hourly space velocity of from about 0.1 hr$^{-1}$ to about 30 hr$^{-1}$.
9. The catalytic cracking of naphtha feed to produce light olefins. Typical reaction conditions include from about 450° C. to about 650° C., pressures of atmospheric to about 8 bars and weight hourly space velocity of from about 5 hr$^{-1}$ to 50 hr$^{-1}$.
10. The catalytic cracking of butenes feed to produce light olefins, e.g. propylene. Typical reaction conditions include from about 450° C. to about 650° C., pressures of atmospheric to about 8 bars and weight hourly space velocity of from about 5 hr$^{-1}$ to 50 hr$^{-1}$.
11. The catalytic cracking of high molecular weight hydrocarbons to lower weight hydrocarbons. The metallosilicate of the instant invention may be employed in combination with conventional catalyst used in fluid catalytic cracking units. Typical reaction conditions for catalytic cracking include temperatures of from about 450° C. to about 650° C., pressures of from about 0.1 bar to about 10 bars, and weight hourly space velocities of from about 1 hr$^{-1}$ to about 300 hr$^{-1}$.
12. The dewaxing of hydrocarbons by selectively removing straight chain paraffins. Typical reaction conditions include a temperature between about 200° C. and 450° C., a pressure from 10 to up to 100 bars and a liquid hourly space velocity from 0.1 hr$^{-1}$ to 20 hr$^{-1}$.
13. The hydrocracking of heavy petroleum feedstocks. The metallosilicate catalyst contains an effective amount of at least one hydrogenation component of the type employed in hydrocracking catalysts.
14. A combination hydrocracking/dewaxing process in which optionally more than one metallosilicate or combinations of metallosilicate with other zeolites or molecular sieves are employed.
15. The conversion of light paraffins to olefins and/or aromatics. Typical reaction conditions include temperatures from about 425° C. to about 750° C. and pressures from about 1 to about 60 bars.
16. The conversion of light olefins to gasoline, distillate and lube range hydrocarbons. Typical reaction conditions include temperatures of from about 175° C. to about 450° C. and a pressure of from about 3 to about 100 bars.
17. The conversion of naphtha (e.g. C6-C10) into products having a substantial higher octane aromatics content by contacting the hydrocarbon feed with the catalyst at a temperature in the range of from about 400° C. to 600° C., preferably 480° C. to 550° C. at pressures ranging from atmospheric to 40 bar and liquid hourly space velocities ranging from 0.1 hr$^{-1}$ to 35 hr$^{-1}$.
18. The reaction of alcohols with olefins to provide mixed ethers, e.g., the reaction of methanol or ethanol with isobutene and/or isopentene to provide methyl-t-butyl ether (MTBE) or ethyl-t-butyl ether (ETBE) and/or t-amyl methyl ether (TAME) or t-amyl-ethyl-ether (TAEE). Typical conversion conditions including temperatures from about 20° C. to about 250° C., pressures from 2 to about 100 bar, a liquid hourly space from about 0.1 hr$^{-1}$ to about 200 hr$^{-1}$ and an alcohol to olefin molar feed ratio from about 0.2/1 to about 3/1.
19. The decomposition of ethers like MTBE, ETBE, TAME or TAEE into isobutene and isopentenes and the corresponding alcohol. Typical conversion conditions including temperatures from about 20° C. to about 300° C., pressures from 0.5 to about 10 bars, a liquid hourly space from about 0.1 hr$^{-1}$ to about 200 hr$^{-1}$.
20. The conversion of oxygenates, e.g., alcohols, such as methanol, or ethers, such as dimethylether, or mixtures thereof to hydrocarbons including olefins and aromatics with reaction conditions including a temperature of from about 275° C. to about 600° C., a pressure of from about 0.5 bar to about 60 bar and a liquid hourly space velocity of from about 0.1 hr$^{-1}$ to about 100 hr$^{-1}$
21. The oligomerization of straight and branched chain olefins having from about 2 to about 10 carbon atoms. The oligomers that are the products of the process have 6 to about 50 carbons, which are useful for both fuels blending feedstock, as solvents, lube oils, alkylation agents and reactants for preparing various kinds of oxygen containing chemicals. The oligomerization process is generally carried out at a temperature in the range of from about 150° C. to about 350° C., a liquid hourly space velocity of from about 0.2 hr$^{-1}$ to about 70 hr$^{-1}$ and a pressure of from about 5 to about 100 bar.

The invention is illustrated by the following non-limiting Examples.

In the following Examples, the techniques used to produce and characterise the obtained materials are given.

X-ray diffraction was used to obtain a diffraction pattern, to ensure that desired crystal structure is confirmed or to detect presence of foreign crystalline phases and to determine degree of crystallinity compared with a reference zeolite. The diffractometer was a Philips PW1830 (Co Kα). To determine percentage of zeolite crystallinity, the intensity of 7 peaks (15.5, 16.25, 17.2, 18, 18.5, 27, 28 °2θ) typical for MFI zeolites was normalised to those of the reference zeolite.

The spatial distribution of the constituting elements was measured by means of "secondary ion mass spectrometry" or SIMS. The apparatus used was a CAMECA TOF-SIMS IV. To avoid charge effects, zeolites being non-conductive materials, a low energy electron floodgun was used. To realise in depth composition profiles, a sputtering gun was used simultaneously to the analysis gun. Both guns used argon as primary ions, the energy of the sputtering gun ion beam being 3 keV for a current density of 20 nA, and the analysis gun having an energy of 10 keV with a current of 1 pA.

The sputtering gun eroded a surface area of 200×200 micron, and the surface analysis gun scanned a surface area of about 5×5 micron. Profiles were performed in non-interlaced mode, meaning that analysis and sputtering of the samples was completely dissociated. The cycle sequence was as follows: 30 seconds analysis—30 seconds sputtering—2 seconds pausing. Zeolite powder was compacted and pressed into a wafer. The wafers were fixed on a support and placed in a vacuum of 10-6 to 10-7 Torr. After degassing for a period of 24 hours analysis was performed. Only monoatomic species of aluminium and silicon were taken into account for concentration profiles and only the double charged cations are considered for quantitative measurements ($Si^{2+}/Al^{2+}$). A prior calibration had been realised on zeolites with well know Si/Al ratios. Under the circumstances of the analysis the calibration curve responded to the following equation:

$$Si/Al \text{ in framework} = 2.1008 \, Si^{2+}/Al^{2+} \text{ by SIMS}$$

By means of a profilometer the erosion velocity had been measured and corresponded to 0.17 nm/second.

COMPARATIVE EXAMPLE 1

An MFI aluminosilicate with a Si/Al ratio of about 89 was prepared by mixing solutions A and B.

Solution A: 9.1 g of sodium hydroxide in 25 ml of distilled water and 1.875 g of $Al_2(SO_4)_3 \cdot 18H_2O$.

Solution B: 26.81 g of tetrapropylammonium bromide in 500 ml of distilled water and 108.18 g of colloidal silica containing 40 wt % SiO2 (sold under the trade name of Ludox HS-40 and available in commerce from DuPont Chemicals).

200.26 gram of Solution B was mixed in a 300 ml autoclave for a period of 15 minutes and a hydrogel was obtained by adding slowly 12.11 gram of solution A. The pH of the aqueous solution was about 12.2. After stirring for 30 minutes at room temperature, the autoclave was fixed on a rotating axe of a laboratory oven. The crystallisation temperature was increased in about 2 hours to 150° C., which was maintained for 24 hours at a rotating speed of about 8 rpm. The product was cooled and washed with 10 liters of distilled water, dried at 110° C. for 16 hours and then calcined at 600° C. for 10 hours in order to remove the organic material.

Figure 1:
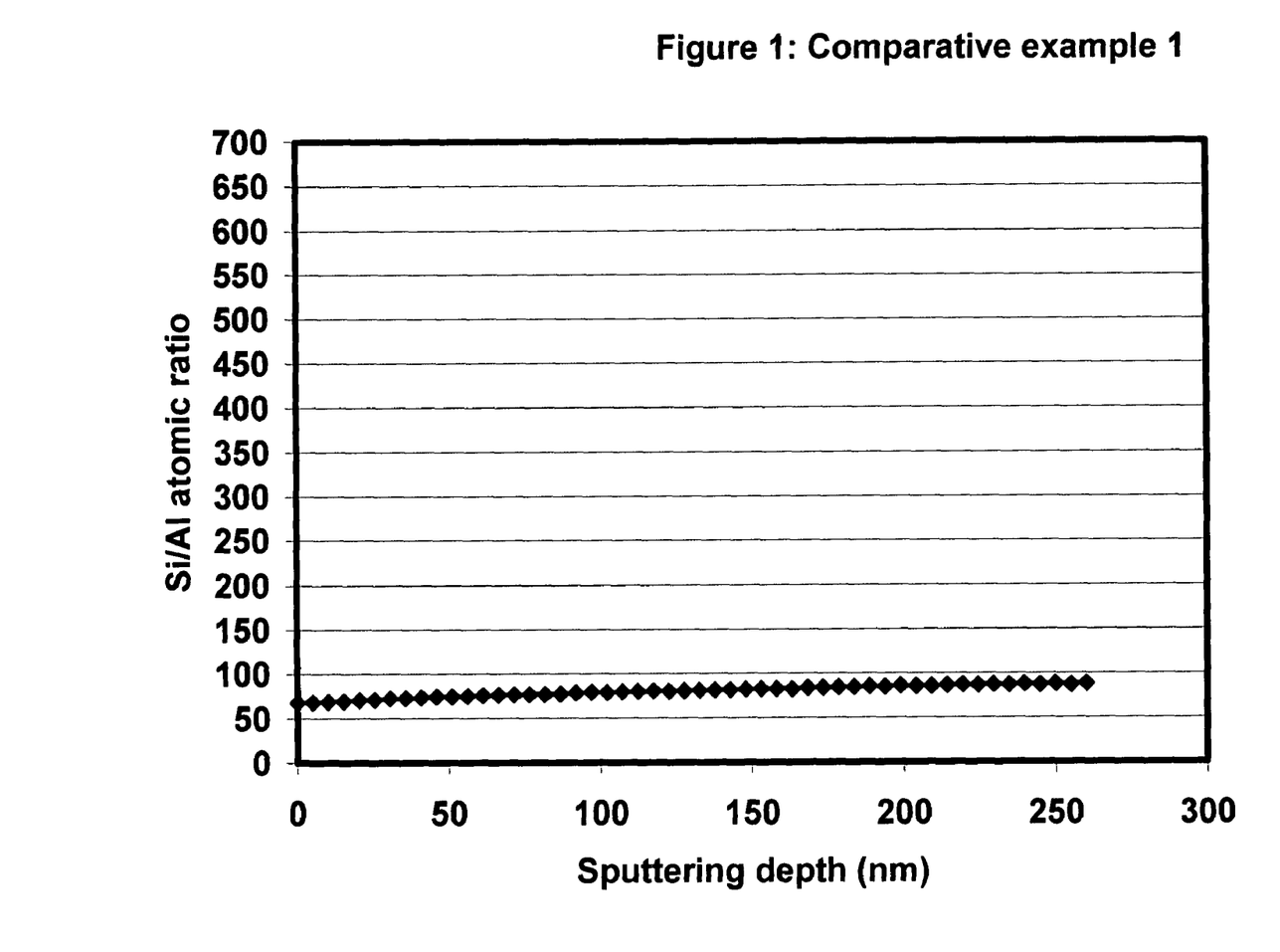
FIG. 1 is a graph which shows the relationship between Si/Al atomic ratio and sputtering depth for crystalline metallosilicates produced in accordance with Comparative Example 1.

The crystallinity of the obtained aluminosilicate was 100% and corresponded to the diffraction pattern of MFI zeolites. The crystals had a size of about 1.5-3 micrometer. The Si/Al profile as obtained by SIMS is given in FIG. 1.

EXAMPLE 1

An MFI aluminosilicate with a Si/Al ratio of about 81 was prepared by mixing solutions A, B and C.

Solution A: 17.9 g of sodium hydroxide in 50 ml of distilled water and 3.7 g of $Al_2(SO_4)_3 \cdot 18H_2O$.

Solution B: 53.61 g of tetrapropylammonium bromide in 675 ml of distilled water and 216.9 g of colloidal silica containing 40 wt % SiO2 (Ludox HS-40).

Solution C: 325 ml of hexan-1-ol.

Solutions B and C were mixed in a 2-liter autoclave for a period of 15 minutes and a hydrogel was obtained by adding slowly solution A. The pH of the aqueous solution was about 12.76. After stirring for 30 minutes at room temperature, the crystallisation temperature was increased in about 2 hours to 150° C., which was maintained for 24 hours at a stirring rate of about 150 rpm. The product was cooled and washed with 10 liters of distilled water, dried at 110° C. for 16 hours and then calcined at 600° C. for 10 hours in order to remove the organic material.

Figure 2:
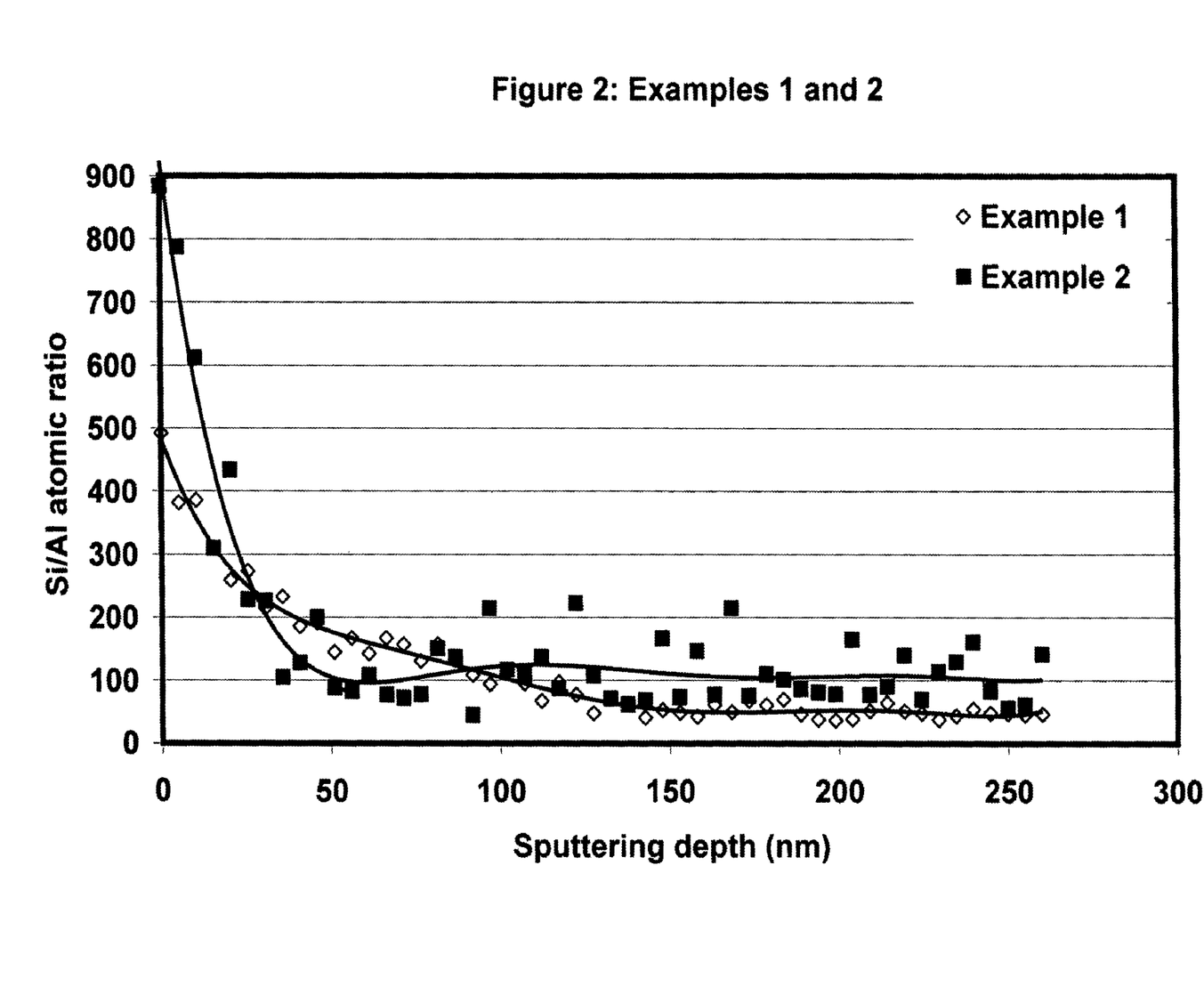
FIG. 2 is a graph which shows the relationship between Si/Al atomic ratio and sputtering depth for crystalline metallosilicates produced in accordance with Example 1 and 2 of the invention where the amount of organic silicon source has been varied.

The crystallinity of the obtained aluminosilicate was 100% and corresponded to the diffraction pattern of MFI zeolites. The crystals had a size of about 1-3 micrometer. The Si/Al profile as obtained by SIMS is given in FIG. 2.

EXAMPLE 2

An MFI aluminosilicate with a Si/Al ratio of about 83 was prepared by mixing solutions A, B and C.

Solution A: 18.1 g of sodium hydroxide in 50 ml of distilled water and 3.75 g of $Al_2(SO_4)_3 \cdot 18H_2O$.

Solution B: 53.61 g of tetrapropylammonium bromide in 675 ml of distilled water and 162.76 g of colloidal silica containing 40 wt % SiO2 (Ludox HS-40).

Solution C: 325 ml of hexan-1-ol and 75.35 g of tetraethylorthosilicate.

Solutions B and C were mixed in a 2-liter autoclave for a period of 15 minutes and a hydrogel was obtained by adding slowly solution A. The pH of the aqueous solution was about 12.25. After stirring for 30 minutes at room temperature, the crystallisation temperature was increased in about 2 hours to 150° C., which was maintained for 24 hours at a stirring rate of about 150 rpm. The product was cooled and washed with 10 liters of distilled water, dried at 110° C. for 16 hours and then calcined at 600° C. for 10 hours in order to remove the organic material.

The crystallinity of the obtained aluminosilicate was 100% and corresponded to the diffraction pattern of MFI zeolites. The crystals had a size of about 1-5 micrometer. The Si/Al profile as obtained by SIMS is given in FIG. 2.

EXAMPLE 3

An MFI aluminosilicate with a Si/Al ratio of about 60 was prepared by mixing solutions A, B and C.

Solution A: 18.19 g of sodium hydroxide in 50 ml of distilled water and 5.85 g of $Al_2(SO_4)_3 \cdot 16H_2O$.

Solution B: 53.61 g of tetrapropylammonium bromide in 775 ml of distilled water and 162.76 g of colloidal silica containing 40 wt % SiO2 (Ludox HS-40).

Solution C: 325 ml of hexan-1-ol and 75.35 g of tetraethylorthosilicate.

Solutions B and C were mixed in a 2-liter autoclave for a period of 15 minutes and a hydrogel was obtained by adding slowly solution A. After stirring for 30 minutes at room temperature, the crystallisation reaction was performed at 150° C. for 24 hours in a stainless steel autoclave at a stirring rate of about 150 rpm. The product was cooled and washed with 10 liters of distilled water, dried at 110° C. for 16 hours and then calcined at 600° C. for 10 hours in order to remove the organic material.

Figure 3:
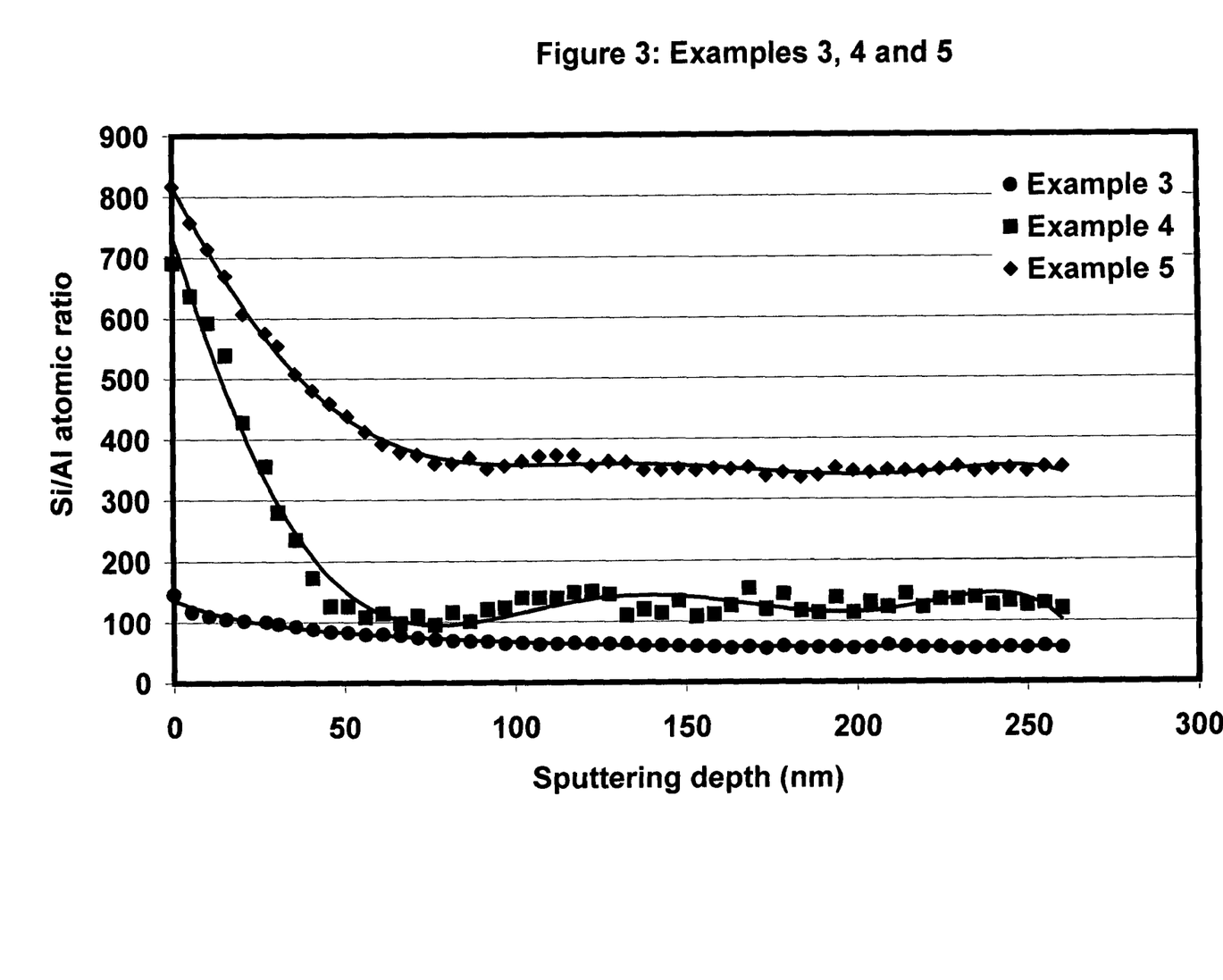
FIG. 3 is a graph which shows the relationship between Si/Al atomic ratio and sputtering depth for crystalline metallosilicates produced in accordance with Example 3, 4 and 5 of the invention where the amount of aluminium in the synthesis mixture has been varied.

The crystallinity of the obtained aluminosilicate was 100% and corresponded to the diffraction pattern of MFI zeolites. The Si/Al profile as obtained by SIMS is given in FIG. 3.

EXAMPLE 4

An MFI aluminosilicate with a Si/Al ratio of about 150 was prepared by mixing solutions A, B and C.

Solution A: 18.19 g of sodium hydroxide in 50 ml of distilled water and 2.81 g of $Al_2(SO_4)_3 \cdot 16H_2O$.

Solution B: 53.61 g of tetrapropylammonium bromide in 775 ml of distilled water and 162.76 g of colloidal silica containing 40 wt % SiO2 (Ludox HS-40).

Solution C: 325 ml of hexan-1-ol and 75.35 g of tetraethylorthosilicate.

Solutions B and C were mixed in a 2-liter autoclave for a period of 15 minutes and a hydrogel was obtained by adding slowly solution A. After stirring for 30 minutes at room temperature, the crystallisation reaction was performed at 150° C. for 24 hours in a stainless steel autoclave at a stirring rate of about 150 rpm. The product was cooled and washed with 10 liters of distilled water, dried at 110° C. for 16 hours and then calcined at 600° C. for 10 hours in order to remove the organic material.

The crystallinity of the obtained aluminosilicate was 100% and corresponded to the diffraction pattern of MFI zeolites. The Si/Al profile as obtained by SIMS is given in FIG. 3.

EXAMPLE 5

An MFI aluminosilicate with a Si/Al ratio of about 315 was prepared by mixing solutions A, B and C.

Solution A: 18.19 g of sodium hydroxide in 50 ml of distilled water and 0.91 g of $Al_2(SO_4)_3 \cdot 16H_2O$.

Solution B: 53.61 g of tetrapropylammonium bromide in 775 ml of distilled water and 162.76 g of colloidal silica containing 40 wt % SiO2 (Ludox HS-40).

Solution C: 325 ml of hexan-1-ol and 75.35 g of tetraethylorthosilicate.

Solutions B and C were mixed in a 2-liter autoclave for a period of 15 minutes and a hydrogel was obtained by adding slowly solution A. After stirring for 30 minutes at room temperature, the crystallisation reaction was performed at 150° C. for 24 hours in a stainless steel autoclave at a stirring rate of about 150 rpm. The product was cooled and washed with 10 liters of distilled water, dried at 110° C. for 16 hours and then calcined at 600° C. for 10 hours in order to remove the organic material.

The crystallinity of the obtained aluminosilicate was 100% and corresponded to the diffraction pattern of MFI zeolites. The Si/Al profile as obtained by SIMS is given in FIG. 3.

COMPARATIVE EXAMPLE 2

An MFI aluminosilicate with a Si/Al ratio of about 87 was prepared by mixing solutions A, B and C.

Solution A: 18.27 g of sodium hydroxide in 50 ml of distilled water and 3.76 g of $Al_2(SO_4)_3.16H_2O$.

Solution B: 53.61 g of tetrapropylammonium bromide in 675 ml of distilled water and 162.89 g of colloidal silica containing 40 wt % SiO2 (Ludox HS-40).

Solution C: 325 ml of butan-1-ol and 75.4 g of tetraethylorthosilicate.

Solutions B and C were mixed in a 2-liter autoclave for a period of 15 minutes and a hydrogel was obtained by adding slowly solution A. After stirring for 30 minutes at room temperature, the crystallisation reaction was performed at 150° C. for 24 hours in a stainless steel autoclave at a stirring rate of about 150 rpm. The product was cooled and washed with 10 liters of distilled water, dried at 110° C. for 16 hours and then calcined at 600° C. for 10 hours in order to remove the organic material.

Figure 4:
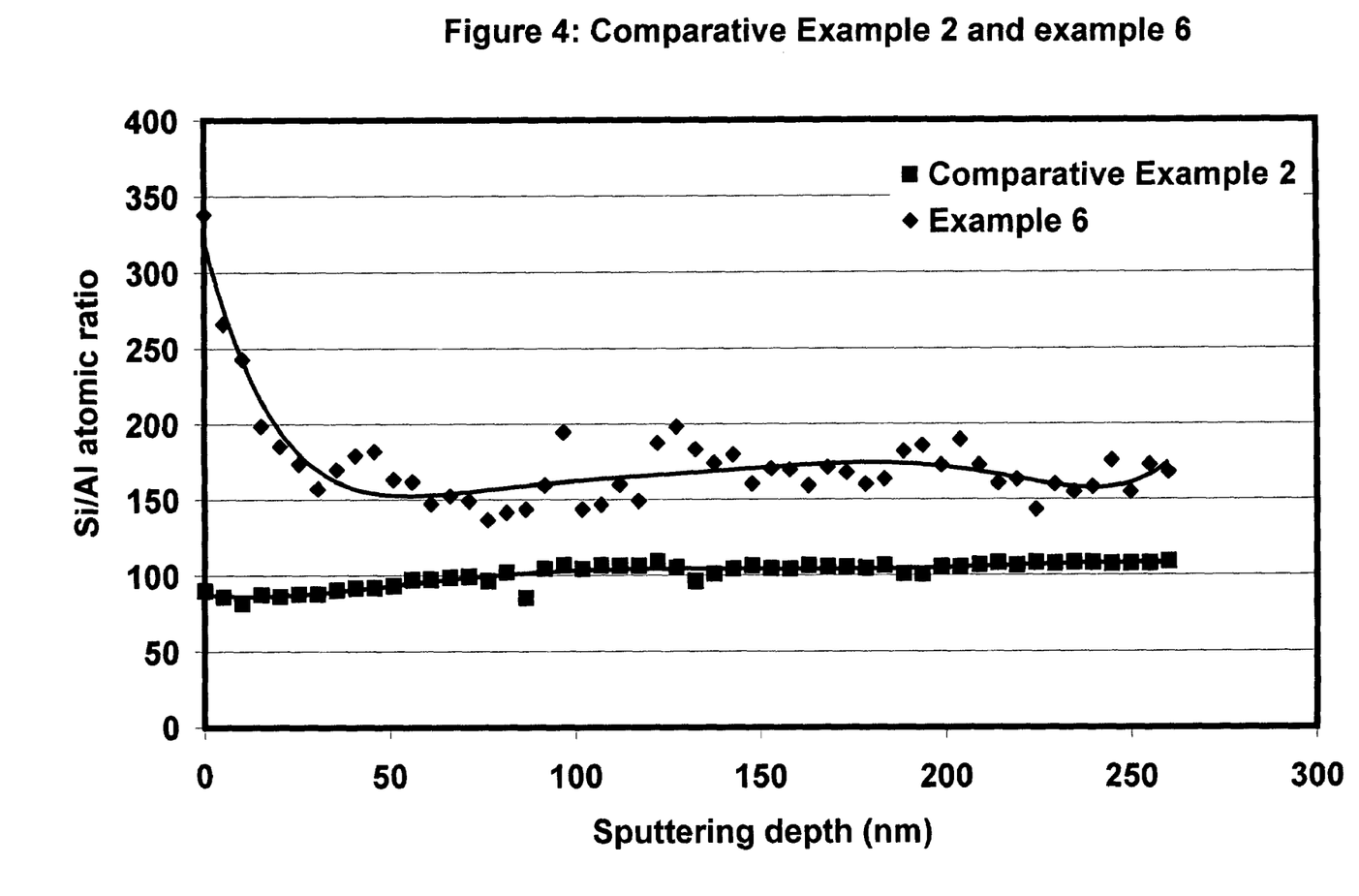
FIG. 4 is a graph which shows the relationship between Si/Al atomic ratio and sputtering depth for crystalline metallosilicates produced in accordance with Comparative example 2 and Example 6 of the invention, where the type of alcohol has been varied.

The crystallinity of the obtained aluminosilicate was 100% and corresponded to the diffraction pattern of MFI zeolites. The crystals had a size of about 1-2 micrometer. The Si/Al profile as obtained by SIMS is given in FIG. 4.

The butan-1-ol is soluble in the aqueous synthesis mixture and so only a single phase liquid medium was formed. Hence the use of the alcohol butan-1-ol did not result in a spatial distribution of aluminium in the zeolite crystal.

EXAMPLE 6

An MFI aluminosilicate with a Si/Al ratio of about 90 was prepared by mixing solutions A, B and C.

Solution A: 18.21 g of sodium hydroxide in 50 ml of distilled water and 3.75 g of $Al_2(SO_4)_3.16H_2O$.

Solution B: 53.61 g of tetrapropylammonium bromide in 675 ml of distilled water and 162.77 g of colloidal silica containing 40 wt % SiO2 (Ludox HS-40).

Solution C: 325 ml of octan-1-ol and 75.4 g of tetraethylorthosilicate.

Solutions B and C were mixed in a 2-liter autoclave for a period of 15 minutes and a hydrogel was obtained by adding slowly solution A. After stirring for 30 minutes at room temperature, the crystallisation reaction was performed at 150° C. for 24 hours in a stainless steel autoclave at a stirring rate of about 150 rpm. The product was cooled and washed with 10 liters of distilled water, dried at 110° C. for 16 hours and then calcined at 600° C. for 10 hours in order to remove the organic material. The crystallinity of the obtained aluminosilicate was 100% and corresponded to the diffraction pattern of MFI zeolites. The crystals had a size of about 0.5-1.0 micrometer. The Si/Al profile as obtained by SIMS is given in FIG. 4.

The octan-1-ol is insoluble in the aqueous synthesis mixture and so a two phase liquid medium was formed. Hence the use of the alcohol octan-1-ol resulted in a spatial distribution of aluminium in the zeolite crystal.

COMPARATIVE EXAMPLE 3

An MFI aluminosilicate with a Si/Al ratio of about 100 was prepared by mixing solutions A and B.

Solution A: 18.2 g of sodium hydroxide in 50 ml of distilled water and 3.75 g of $Al_2(SO_4)_3.16H_2O$.

Solution B: 53.61 g of tetrapropylammonium bromide in 1100 ml of distilled water and 222 g of colloidal silica containing 40 wt % SiO2 (Ludox HS-40).

Solutions A and B were mixed in a 2-liter autoclave for a period of 15 minutes. After stirring for 30 minutes, the crystallisation reaction was performed at 150° C. for 24 hours in a stainless steel autoclave, stirred at 150 rpm. The product was washed with 10 liters of distilled water, dried at 110° C. for 16 hours and then calcined at 600° C. for 10 hours in order to remove the organic material.

The obtained metallosilicate was ion-exchanged by means of a 0.5 M ammonium chloride solution (4.2 ml/gr aluminosilicate) at about 100° C. respectively for periods of 3, 18 and 3 hours in order to reduce the sodium content. The material was then dried at 110° C. for a period 16 hours and calcined at 400° C. for a period of 3 hours.

Figure 5:
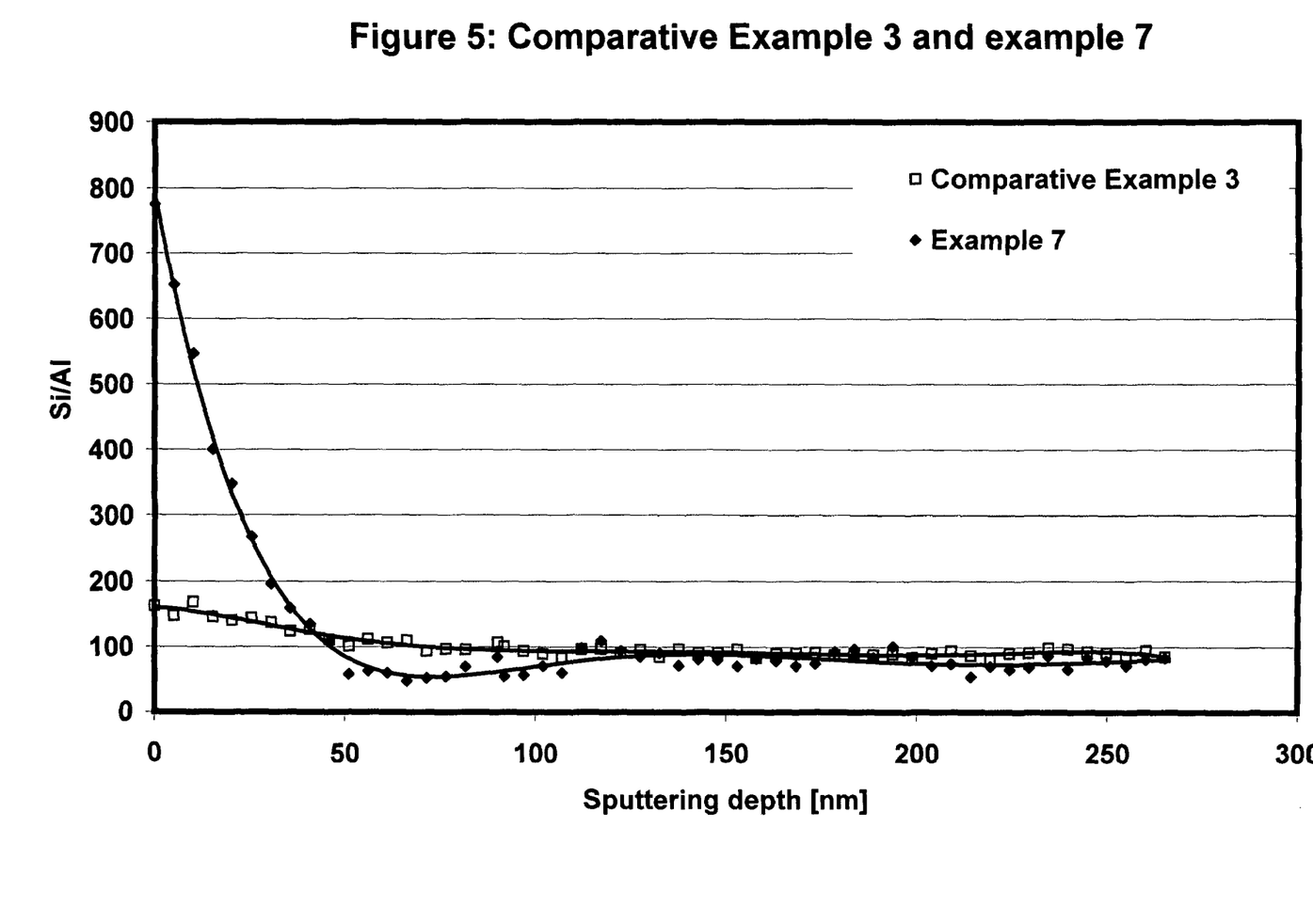
FIG. 5 is a graph which shows the relationship between Si/Al atomic ratio and sputtering depth for crystalline metallosilicates produced in accordance with Comparative Example 3 and Example 7 of the invention.

The Si/Al profile as obtained by SIMS is given in FIG. 5.

EXAMPLE 7

An MFI aluminosilicate with a Si/Al ratio of about 106 was prepared by mixing solutions A, B and C.

Solution A: 18.19 g of sodium hydroxide in 50 ml of distilled water and 3.75 g of $Al_2(SO_4)_3.16H_2O$.

Solution B: 53.61 g of tetrapropylammonium bromide in 775 ml of distilled water and 162.76 g of colloidal silica containing 40 wt % SiO2 (Ludox HS-40).

Solution C: 325 ml of hexan-1-ol and 75.35 g of tetraethylorthosilicate.

Solutions B and C were mixed in a 2-liter autoclave for a period of 15 minutes and a hydrogel was obtained by adding slowly solution A. After stirring for 30 minutes, the crystallisation reaction was performed at 150° C. for 24 hours in a stainless steel autoclave, stirred at 150 rpm. The product was washed with 10 liters of distilled water, dried at 110° C. for 16 hours and then calcined at 600° C. for 10 hours in order to remove the organic material.

The obtained metallosilicate was ion-exchanged by means of a 0.5 M ammonium chloride solution (4.2 ml/gr aluminosilicate) at about 100° C. respectively for periods of 3, 18 and 3 hours in order to reduce the sodium content. The material was then dried at 110° C. for a period of 16 hours and calcined at 400° C. for a period of 3 hours.

The relative molar composition of the synthesis mixture and the chemical global composition of the obtained products are given in table 1. The Si/Al profile as obtained by SIMS is given in FIG. 5.

EXAMPLE 8

Figure 6:
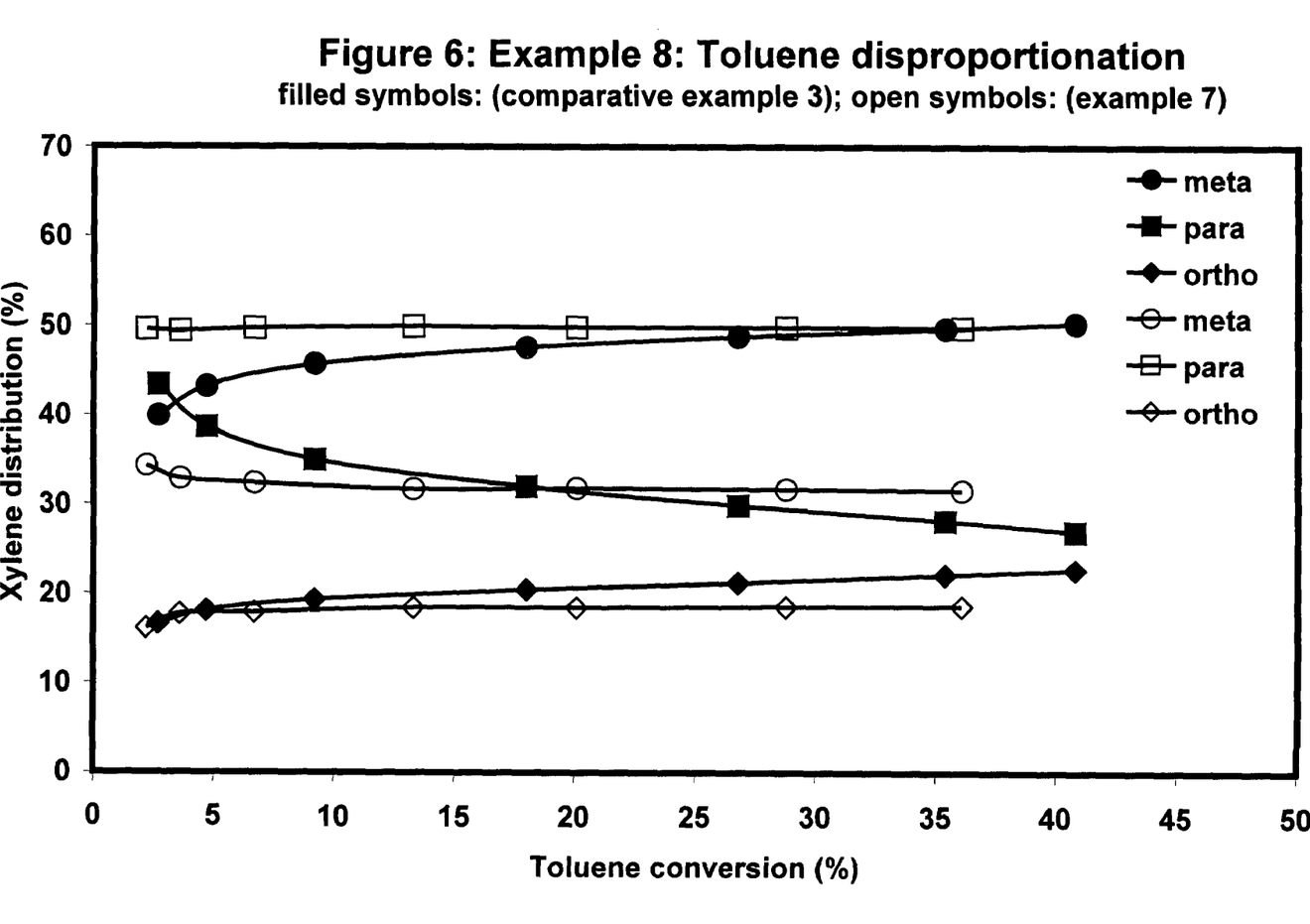
FIG. 6 is a graph which shows the relationship between xylene distribution and toluene conversion in a process for the disproportionation of toluene using catalysts incorporating the crystalline metallosilicates produced in accordance with Comparative Example 3 and Example 7 of the invention.

In this Example the zeolites produced according to Comparative Example 3 and Example 7 were tested for their activity in the disproportionation of toluene in a continuous fixed bed reactor. Each zeolite was pressed and crushed in order to obtain particles of 35-45 mesh. These were loaded in a stainless steel reactor of 10 mm internal diameter. The catalytic tests were done under the following conditions:
  2.26 gram of zeolite
  activation of the zeolite at 500° C. under nitrogen flow
  Temperature between 400 and 550° C.
  WHSV was 4 h$^{-1}$
  Hydrogen/toluene ratio was 3 molar
  Outlet pressure was 30 bars The catalytic results are shown in FIG. 6. The zeolite of Comparative Example 3, exhibiting still an aluminium-rich external zeolite surface, had increased paraxylene selectivity only at low toluene conversion and tended to the thermodynamic equilibrium at higher conversion. The zeolite of Example 7, exhibiting an aluminium-poor external zeolite surface, had at all conversion levels a constant para-xylene selectivity of about 50%. Without being bound to any theory, the inventors believe that this increased para-xylene selectivity is due to the nearly inert external surface of the zeolite so that the imposed shape selectivity of the pore system of the zeolite is not scrambled by acid sites at the external surface of the zeolite where no steric constraints are present.

TABLE 1

| Examples | Relative molar composition of synthesis mixture | | | | | | Product analysis | |
| --- | --- | --- | --- | --- | --- | --- | --- | --- |
|  | $SiO_2$ | $Al_2O_3$ | TPABr | $Na_2O$ | $H_2O$ | alcohol | $Al_2O_3$ wt % | Si/Al |
| Comparative Example 1 | 1 | 0.00449 | 0.1392 | 0.1814 | 45.63 | 0.0000 | 0.927 | 89 |
| Example 1 | 1 | 0.00416 | 0.1389 | 0.1678 | 32.91 | 1.7928 | 1.025 | 81 |
| Example 2 | 1 | 0.00414 | 0.1389 | 0.1663 | 31.67 | 1.7933 | 0.997 | 83 |
| Example 3 | 1 | 0.00666 | 0.1389 | 0.1671 | 35.55 | 1.7933 | 2.878 | 60 |
| Example 4 | 1 | 0.00333 | 0.1389 | 0.1671 | 35.50 | 1.7933 | n.a. | n.a. |
| Example 5 | 1 | 0.00124 | 0.1389 | 0.1671 | 35.47 | 1.7933 | 0.553 | 315 |
| Comparative Example 2 | 1 | 0.00437 | 0.1388 | 0.1677 | 35.49 | 2.4584 | 0.954 | 87 |
| Example 6 | 1 | 0.00436 | 0.1389 | 0.1672 | 35.51 | 1.4299 | 0.924 | 90 |
| Comparative Example 3 | 1 | 0.00434 | 0.1357 | 0.1668 | 48.22 | 0.0000 | 0.495 | 100 |
| Example 7 | 1 | 0.00436 | 0.1389 | 0.1671 | 35.52 | 1.7933 | 0.470 | 106 |

The invention claimed is:

1. A process for producing a crystalline metallosilicate composition, the process comprising the steps of:
  (a) providing a two-phase liquid medium comprising an aqueous liquid phase and a non-aqueous liquid phase, the two-phase liquid medium further comprising at least one silicon-containing compound and at least one metal-containing compound, wherein the at least one silicon-containing compound is present in both the aqueous liquid phase and the non-aqueous liquid phase, and the at least one metal-containing compound is present in substantially the aqueous liquid phase; and
  (b) crystallising the crystalline metallosilicate composition from the two-phase liquid medium; wherein each crystallite has an outer surface and an inner part; and the metallosilicate composition has a continuous spatial distribution of silicon to metal, and an atomic ratio of silicon to metal that decreases continuously from the outer surface to the inner part of each crystallite.

2. A process according to claim 1 wherein the at least one silicon-containing compound is selected from at least one of an alkali metal silicate, a tetraalkyl orthosilicate, precipitated silica, pyrogenic silica, and an aqueous colloidal suspension of silica.

3. A process according to claim 1 wherein the at least one metal-containing compound is selected from at least one of the metal oxide, a metal salt, and a metal alkoxide.

4. A process according to claim 3 wherein the metallosilicate is an aluminosilicate, and the at least one metal-containing compound comprises an aluminium compound for which the source of aluminum is selected from at least one of hydrated alumina dissolved in an alkaline solution, aluminum metal, a water-soluble aluminum salt, such as aluminum sulphate or aluminium chloride, sodium aluminate and an alkoxide, such as aluminum isopropoxide.

5. A process according to claim 3 wherein the metallosilicate is a borosilicate, and the at least one metal-containing compound comprises a boron compound for which the source of boron is selected from at least one of hydrated boron oxide dissolved in an alkaline solution, a water-soluble boron salt, such as boron chloride, and an alkoxide.

6. A process according to claim 3 wherein the metallosilicate is a ferrosilicate, and the at least one metal-containing compound comprises an iron compound for which the source of iron is a water soluble iron salt.

7. A process according to claim 3 wherein the metallosilicate is a gallosilicate, and the at least one metal-containing compound comprises a gallium compound for which the source of gallium is a water soluble gallium salt.

8. A process according to claim 3 wherein the metallosilicate is a titanosilicate, and the at least one metal-containing compound comprises a titanium compound for which the source of titanium is selected from at least one of titanium halides, titanium oxyhalides, titanium sulphates and titanium alkoxides.

9. A process according claim 1 wherein the non-aqueous liquid phase comprises an organic solvent which is substantially water insoluble or water immiscible.

10. A process according to claim 9 wherein the organic solvent comprises at least one of an alcohol having at least 5 carbon atoms or a mercaptan having at least 5 carbon atoms.

11. A process according to claim 10 wherein the alcohol has up to 18 carbon atoms and the mercaptan has up to 18 carbon atoms.

12. A process according to claim 1 wherein the weight ratio of the liquid medium of the non-aqueous liquid phase to the liquid medium of the aqueous liquid phase is from 0.01/1 to 5/1.

13. A process according to claim 1 wherein the molar ratio of the liquid medium of the non-aqueous liquid phase to the silicon in the two-phase liquid medium is from 100/1 to 0.5/1.

14. A process according to claim 1 further comprising the step of forming the two-phase liquid medium by providing a first, aqueous, medium and a second, non-aqueous, medium and combining the first and second media together to form the two-phase liquid medium.

15. A process according to claim 14 wherein the first, aqueous, medium comprises a first portion of the at least one silicon-containing compound and the second, non-aqueous, medium comprises a second portion of the at least one silicon-containing compound.

16. A process according to claim 15 wherein the first, aqueous, medium comprises from 25 to less than 100 wt % of the at least one silicon-containing compound and the second, non-aqueous, medium comprises from greater than 0 to 75 wt % of the at least one silicon-containing compound.

17. A process according to claim 14 wherein the first, aqueous, medium comprises a first silicon-containing compound and the second, non-aqueous, medium comprises a second silicon-containing compound.

18. A process according to claim 14 wherein the second silicon-containing compound comprises a silicon alkoxide.

19. A process according to claim 14 further comprising adding to the two-phase liquid medium an aqueous solution or dispersion of the at least one metal-containing compound.

20. A hydrocarbon conversion process comprising:
providing a crystalline metallosilicate composition produced in accordance with claim 1 as a catalyst; and
contacting said catalyst with a hydrocarbon feed.

21. A crystalline metallosilicate composition comprising crystallites having a crystal outer surface layer having a depth of about 10 nm below the outer surface, and an inner part extending inwardly from a depth of about 50 nm below the outer surface, wherein the atomic ratio of silicon to metal in the metallosilicate composition is at least 1.5 times higher in the crystal outer surface layer as compared to that in the inner part, and wherein the metallosilicate composition has a continuous spatial distribution of silicon to metal, and an atomic ratio of silicon to metal that decreases continuously from the outer surface to the inner part of each crystallite.

22. A crystalline metallosilicate composition according to claim 21 wherein the inner part has a silicon/metal atomic ratio of from 15 to 1000, and the crystal outer surface layer has a silicon/metal atomic ratio of from 22.5 to 15000.

23. A crystalline metallosilicate composition according to claim 21 or claim 22 wherein the inner part has a substantially constant silicon/metal atomic ratio.

24. A crystalline metallosilicate composition according to claim 21 wherein in the inner part the silicon/metal atomic ratio in the walls, constituting the pores in the crystalline metallosilicate composition, is substantially the same as the average silicon/metal atomic ratio of the inner part.

25. A crystalline metallosilicate composition according to claim 21 wherein the metallosilicate is an aluminosilicate, a borosilicate, a ferrosilicate, a gallosilicate, or a titanosilicate.

26. A process of hydrocarbon conversion comprising:
providing a crystalline metallosilicate composition in accordance with claim 21 as a catalyst; and
contacting said catalyst with a hydrocarbon feed.

27. A process for producing a crystalline metallosilicate composition, the process comprising the steps of:
(a) providing an aqueous liquid comprising at least one silicon-containing compound dissolved or dispersed therein;
(b) providing a non-aqueous liquid;
(c) combining the aqueous liquid and the non-aqueous liquid to form a two-phase liquid medium;
(d) either (i) additionally providing the aqueous liquid provided in step (a) with at least one metal-containing compound dissolved or dispersed therein or (ii) adding, either to the aqueous liquid provided in step (a), prior to step (c), or to the two-phase liquid medium formed in step (c), an aqueous solution or dispersion of the at least one metal-containing compound, and
(e) crystallising the crystalline metallosilicate composition from the two-phase liquid medium; wherein each crystallite has an outer surface and an inner part; and wherein the metallosilicate composition has a continuous spatial distribution of silicon to metal, and an atomic ratio of silicon to metal that decreases continuously from the outer surface to the inner part of each crystallite.

28. A process according to claim 27 wherein the at least one silicon-containing compound is selected from at least one of an alkali metal silicate, a tetraalkyl orthosilicate, precipitated silica, pyrogenic silica, and an aqueous colloidal suspension of silica.

29. A process according to claim 27 or 28 wherein the at least one metal-containing compound is selected from at least one of the metal oxide, a water-soluble metal salt, and a metal alkoxide.

30. A process according to claim 27 wherein the metallosilicate is an aluminosilicate, a borosilicate, a ferrosilicate, a gallosilicate, or a titanosilicate.

31. A process according to claim 27 wherein the non-aqueous liquid-comprises an organic solvent which is substantially water insoluble or water immiscible.

32. A process according to claim 31 wherein the organic solvent comprises at least one of an alcohol having at least 5 carbon atoms or a mercaptan having at least 5 carbon atoms.

33. A process according to claim 32 wherein the alcohol has up to 18 carbon atoms and the mercaptan has up to 18 carbon atoms.

34. A process according to claim 27 wherein the weight ratio of the non-aqueous liquid to water in the two-phase liquid medium is from 0.01/1 to 5/1.

35. A process according to claim 27 wherein the molar ratio of the non-aqueous liquid phase to the silicon in the two-phase liquid medium is from 100/1 to 0.5/1.

36. A process according to claim 27 wherein the aqueous liquid provided in step (a) comprises a first silicon-containing compound and the non-aqueous liquid provided in step (b) comprises a second silicon-containing compound dissolved or dispersed therein.

37. A process according to claim 36 wherein in the two-phase liquid medium the first silicon-containing compound comprises from 25 to less than 100 wt % of the at least one silicon-containing compound and the second silicon-containing compound comprises from greater than 0 to 75 wt % of the at least one silicon-containing compound.

38. A process according to claim 36 or claim 37 wherein the second silicon-containing compound comprises a silicon alkoxide.

39. A process according to claim 27 wherein the aqueous liquid provided in step (a) comprises all of the at least one silicon-containing compound.

40. A process according to claim 27 wherein the aqueous solution or dispersion of the at least one metal-containing compound added in step (d) comprises all of the at least one metal-containing compound.

41. A process according to claim 27 wherein the aqueous solution or dispersion of the at least one metal-containing compound added in step (d) further comprises a structure directing agent for the metallosilicate comprising at least one organic or inorganic compound containing nitrogen, oxygen, sulphur or phosphorous.

42. A process of hydrocarbon conversion comprising:
providing a crystalline metallosilicate composition produced in accordance with claim 27 as a catalyst; and
contacting said catalyst with a hydrocarbon feed.

* * * * *